United States Patent
Paul et al.

(10) Patent No.: US 8,400,683 B2
(45) Date of Patent: Mar. 19, 2013

(54) STREAK COMPENSATION USING MODEL BASED PROJECTIONS FOR RUN TIME UPDATES

(75) Inventors: Peter Paul, Webster, NY (US); Claude S. Fillion, Rochester, NY (US); Stuart A. Schweid, Pittsford, NY (US); Douglas R. Taylor, Webster, NY (US); Brian R. Conrow, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 509 days.

(21) Appl. No.: 12/781,085

(22) Filed: May 17, 2010

(65) Prior Publication Data

US 2010/0220363 A1 Sep. 2, 2010

Related U.S. Application Data (63) Continuation-in-part of application No. 12/277,594, filed on Nov. 25, 2008, now Pat. No. 7,952,761.

(60) Provisional application No. 61/056,754, filed on May 28, 2008.

(51) Int. Cl.
 *H04N 1/409* (2006.01)
(52) U.S. Cl. .......... 358/3.26; 358/1.9; 358/3.06; 399/49
(58) Field of Classification Search .................. 358/1.9, 358/3.01, 3.06, 3.26, 504; 399/49, 53
See application file for complete search history.

(56) References Cited

U.S. PATENT DOCUMENTS

| | | | |
|---|---|---|---|
| 4,553,033 A | 11/1985 | Hubble, III et al. | |
| 5,680,426 A * | 10/1997 | Ching-Ming | 378/8 |
| 5,749,020 A | 5/1998 | Mestha et al. | |
| 5,800,306 A * | 9/1998 | Mori | 477/62 |
| 5,963,244 A | 10/1999 | Mestha et al. | |
| 6,021,285 A | 2/2000 | Mestha et al. | |
| 6,345,128 B1 * | 2/2002 | Stokes | 382/254 |
| 6,636,628 B1 | 10/2003 | Wang et al. | |
| 6,697,582 B1 * | 2/2004 | Scheuer | 399/49 |
| 6,760,056 B2 | 7/2004 | Klassen et al. | |
| 7,038,816 B2 | 5/2006 | Klassen et al. | |
| 7,127,187 B2 * | 10/2006 | Mo et al. | 399/49 |
| 7,236,711 B2 | 6/2007 | Burry et al. | |
| 7,268,913 B2 * | 9/2007 | Murashita | 358/1.9 |
| 7,347,525 B2 | 3/2008 | Mizes | |
| 7,411,688 B1 * | 8/2008 | Zhai et al. | 356/601 |
| 2003/0142110 A1 * | 7/2003 | Murashita | 345/600 |
| 2005/0036705 A1 | 2/2005 | Viassolo et al. | |
| 2005/0099446 A1 | 5/2005 | Mizes et al. | |
| 2005/0134623 A1 | 6/2005 | Mizes | |
| 2005/0134624 A1 | 6/2005 | Mizes | |
| 2006/0001911 A1 | 1/2006 | Viassolo et al. | |

(Continued)

OTHER PUBLICATIONS

Non-Final Office Action mailed Jan. 5, 2011 in U.S. Appl. No. 12/112,618, pp. 1-20.

(Continued)

*Primary Examiner* — Kimberly A Williams
(74) *Attorney, Agent, or Firm* — Fay Sharpe LLP (57) ABSTRACT

Streak compensation in a digital printer is provided utilizing a spatially varying Printer Model and Run Time updates to generate Spatially Varying Tone Reproduction Curves (STRCs) which are used as actuators to compensate for streaks during run time. A full width array sensor is used to measure streak profiles and the STRCs are used as actuators to compensate for streaks. Streak profile measurements taken at a limited number of area coverage levels combined with a Printer Streaks Basis Function Model are used to estimate and project the streak behavior at all area coverage levels and at all inboard-to-outboard spatial locations. The projection is then used in a pixel-wise error feedback control scheme to drive each profile to a desired shape, thereby compensating for streaks.

20 Claims, 6 Drawing Sheets

U.S. PATENT DOCUMENTS

| | | |
|---|---|---|
| 2006/0077488 A1 | 4/2006 | Zhang et al. |
| 2006/0087706 A1* | 4/2006 | Shim et al. ............... 358/504 |
| 2006/0209101 A1 | 9/2006 | Mizes |
| 2006/0245773 A1* | 11/2006 | Gross et al. ............... 399/49 |
| 2007/0139733 A1* | 6/2007 | Mizes et al. ............... 358/504 |
| 2007/0140552 A1 | 6/2007 | Fan et al. |
| 2007/0165259 A1 | 7/2007 | Amorim |
| 2007/0201097 A1* | 8/2007 | Anderson et al. ........... 358/3.06 |
| 2008/0075492 A1* | 3/2008 | Mestha et al. ............... 399/49 |
| 2008/0239344 A1* | 10/2008 | Wang et al. ............... 358/1.9 |
| 2012/0033238 A1* | 2/2012 | Liu ............... 358/1.9 |

OTHER PUBLICATIONS

"Notice of References Cited," from Non-Final Office Action mailed Jan. 5, 2011 in U.S. Appl. No. 12/112,618.

* cited by examiner

STREAK COMPENSATION USING MODEL BASED PROJECTIONS FOR RUN TIME UPDATES

CROSS REFERENCE TO RELATED APPLICATIONS

This application is a continuation in part of U.S. application Ser. No. 12/277,594, filed Nov. 26, 2008 which claims the benefit of U.S. Provisional Application No. 61/056,754, filed May 28, 2008 both of which are hereby incorporated by reference herein in their entirety.

BACKGROUND

This disclosure relates generally to a printing machine and a streak compensation method including scanning a P/R (Photoreceptor Belt) for image non-uniformities and controlling the printing process during run time to reduce or correct the image non-uniformities utilizing Spatially Varying Tone Reproduction Curves (STRCs). More particularly, streak profile measurements taken at a limited number of area coverage levels combined with a Printer Streaks Basis Function Model are used to estimate and project the streak behavior at all area coverage levels and at all inboard-to-outboard spatial locations to improve streak compensation transient response.

A typical electrophotographic, or xerographic, printing machine employs a photoreceptor, that is charged to a substantially uniform potential so as to sensitize the surface thereof. The charged portion of the photoreceptor is exposed to a light image of an original document being reproduced. Exposure of the charged photoreceptor selectively dissipates the charge thereon in the irradiated areas to record an electrostatic latent image on the photoreceptor corresponding to the image contained within the original document. The location of the electrical charge forming the latent image is usually optically controlled. More specifically, in a digital xerographic system, the formation of the latent image is controlled by a raster output scanning device, usually a laser or LED source.

After the electrostatic latent image is recorded on the photoreceptor, the latent image is developed by bringing a developer material into contact therewith. Generally, the electrostatic latent image is developed with dry developer material comprising carrier granules having toner particles adhering triboelectrically thereto. However, a liquid developer material may be used as well. The toner particles are attracted to the latent image, forming a visible powder image on the photoconductive surface. After the electrostatic latent image is developed with the toner particles, the toner powder image is transferred to a sheet, such as paper or other substrate sheets, using pressure and heat to fuse the toner image to the sheet to form a print.

Electrophotographic printing machines of this type can produce color prints using a plurality of stations. Each station has a charging device for charging the photoconductive surface, an exposing device for selectively illuminating the charged portions of the photoconductive surface to record an electrostatic latent image thereon, and a developer unit for developing the electrostatic latent image with toner particles. Each developer unit deposits different color toner particles on the respective electrostatic latent image. The images are developed, at least partially in superimposed registration with one another, to form a multi-color toner powder image. The resultant multi-color powder image is subsequently transferred to a sheet. The transferred multi-color image is then permanently fused to the sheet forming the color print.

Although these xerographic printing machines usually produce a faithful reproduction of the original image, defects in the subsystems of the xerographic system may give rise to cross-process non-uniformities, commonly referred to as streaks or streak defects, which can be a significant factor affecting the overall image quality of the print. Streaks are primarily one-dimensional visible defects in the image that run parallel to the process direction, also referred to as the slow-scan direction. In a uniform gray level patch, streaks may appear as a variation in the reflectance, optical density, or in the colorimetric CIELAB L* value, among other units of color variation well known to practitioners of the art. As used herein, "gray" refers to the digital area coverage value of any single color separation layer, whether the toner is black, cyan, magenta, yellow, or some other color. In a color xerographic machine, streaks in single color separations that may be unobjectionable can cause an undesirable visible color shift for overlaid colors.

Figure 1:
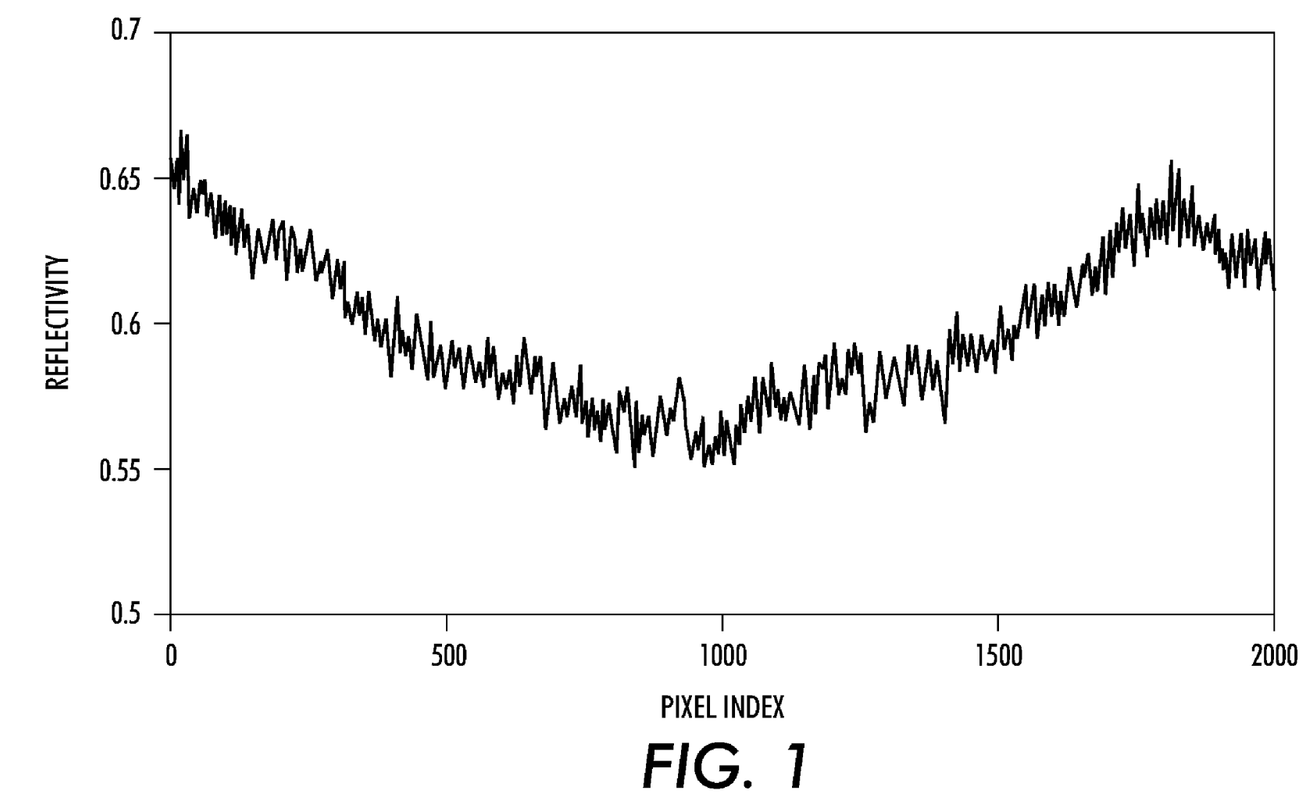
FIG. 1 illustrates an example of a measured reflectance profile in a fast-scan direction for a single color separation.

Conventional printing technologies contain several sources of streaks which cannot be satisfactorily controlled via printer design or printing system optimization. Streaks can be caused by "non-ideal" responses of xerographic components in the marking engine. The source of these artifacts is found in toner adhered on the wires, in dirt on the charging elements, P/R streaks, fuser originated streaks, charge contamination, etc. Streaks can also be caused by non-uniformity of the raster output scanning device spot-size or intensity variations. As shown in FIG. 1, a measured reflectance profile of a single color test image generated by the image forming machine is shown. The reflectance profile is generated by measuring the reflectivity of the image in the cross-process direction. The x-axis in FIG. 1 represents the pixel index in the cross-process direction. The pixel index value represents a location in the cross-process, or "fast scan", direction. The measured reflectance profile illustrates streaks that would manifest themselves as undesired variations in cross-process L* in the test image measured on paper. A desired reflectance profile would be flat.

Various control schemes have been used for correcting streaks in image forming machines. ROS actuation for streak correction has been used, as disclosed US Publication No. 2006/0001911 A1 for "Closed-loop compensation of streaks by ROS intensity variation" by Viassolo et al. The intensity of the illumination source of the raster output scanner is controlled as a function of the fast-scan position to compensate for streaks.

Streak compensation techniques that measure current streak performance of the printer and adjust the digital image using Spatially Varying Tone Reproduction Curves (STRCs) to compensate for the streaks during run-time print jobs have been described in U.S. application Ser. No. 12/277,594, filed Nov. 26, 2008, incorporated by reference above. For high spatial frequency streaks, run time updates of the streak compensation actuator are useful to maintain or improve performance during long print runs. These updates occur every 1 to n belt revolutions, such as for example once every 6 belt revolutions, in typical image forming machines. However, it has been found that streaks can change rapidly due to rapidly changing states within the printer and it is desirable to increase the transient response of the run time control technique described therein to improve the response to new streaks or to streaks that were not completely compensated at cycle up.

BRIEF DESCRIPTION

A method for compensating for streak defects in images formed by a digital printer using a full width sensing device and spatially varying Tone Reproduction Curves is provided.

The method includes constructing a printer streaks basis function model during printer cycle up, printing a set of $N_{AC}$ test images during a print job printing print job images, each test image having a different area coverage level such that the area coverage levels of the set are spaced across the range of tones that the printer can print, and performing a steak control update cycle including: directly measuring the reflectance of a subset of the set of test images having $N_K$ of the test images representing area coverage levels including a shadow region, a midtone and a highlight region of area coverage level, where $N_K < N_{AC}$, projecting across the area coverage levels of all of the test images by inferring the reflectances of the test images not directly measured during the current streak control signal update cycle using the measured reflectances of the subset of test images and the printer streaks basis function model, updating the reflectance profiles for all of the test images, calculating update control signals for a spatially varying tone reproduction control module using the updated reflectance profiles, and printing streak-corrected print job images using the updated control signals to compensate for streaks.

A digital printer performing run time streak compensation of print job print images is provided.

The printer includes a full width array sensor directly measuring the reflectance of a subset of an entire set of test images in a streak control signal update cycle, the subset of test images representing area coverage levels including a shadow region, a midtone and a highlight region of area coverage level; and a signal processing and control unit constructing a printer streaks basis function model during printer cycle up and performing the steak control update cycle by projecting across the area coverage levels of all of the test images by inferring the reflectances of the test images not directly measured during the streak control signal update cycle using the measured reflectances of the subset of test images and the printer streaks basis function model, updating the reflectance profiles for all of the test images, and calculating updated spatially varying tone reproduction control signals for producing streak-corrected print job images using the updated reflectance profiles.

DETAILED DESCRIPTION

Exemplary embodiments shall be described for a method of correcting non-uniformities, or streaks, in images formed by a xerographic image forming device wherein defects are corrected using spatially varying tone reproduction curves.

Figure 2:
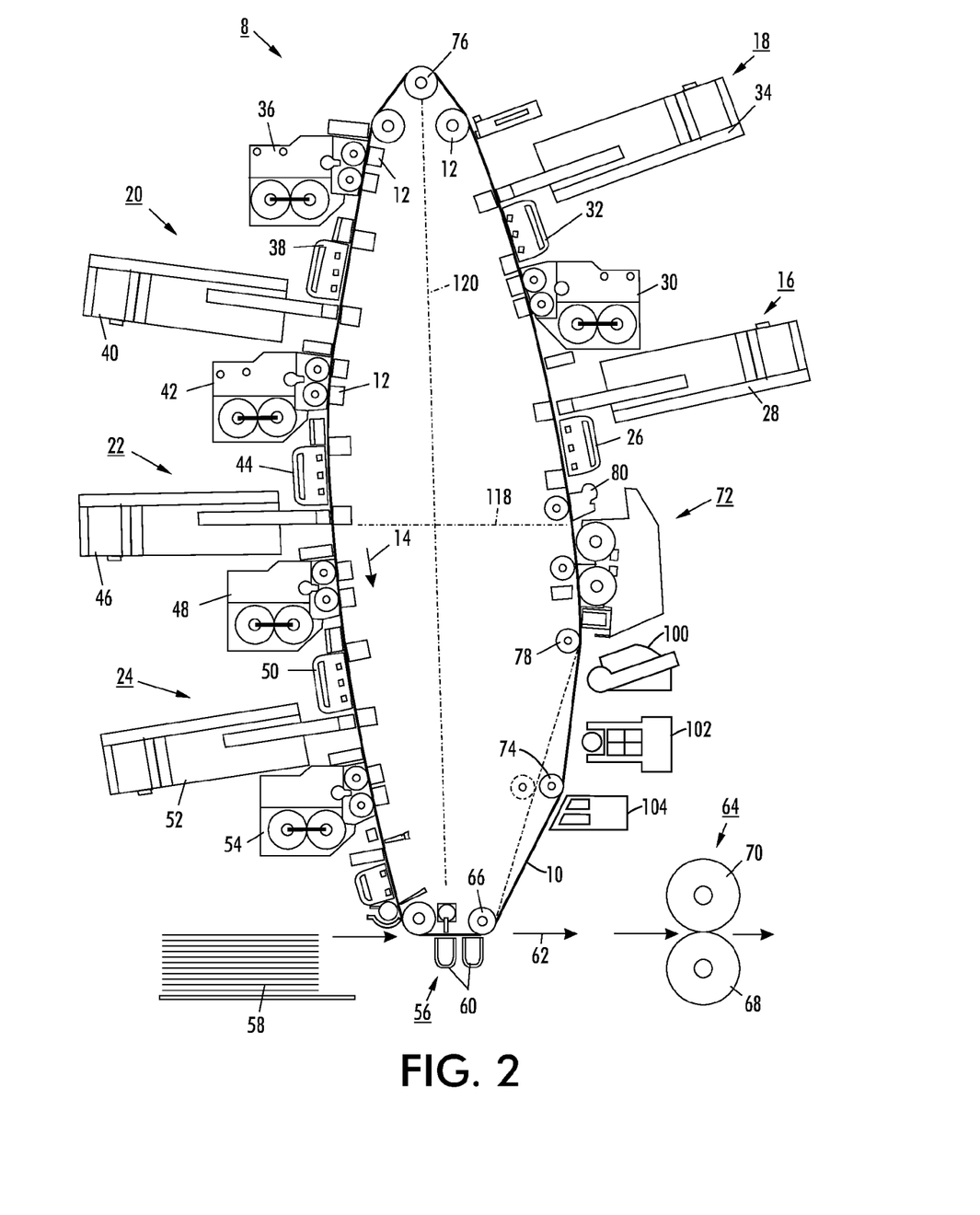
FIG. 2 illustrates a digital printer according to an exemplary embodiment of this disclosure.
Figure 3:
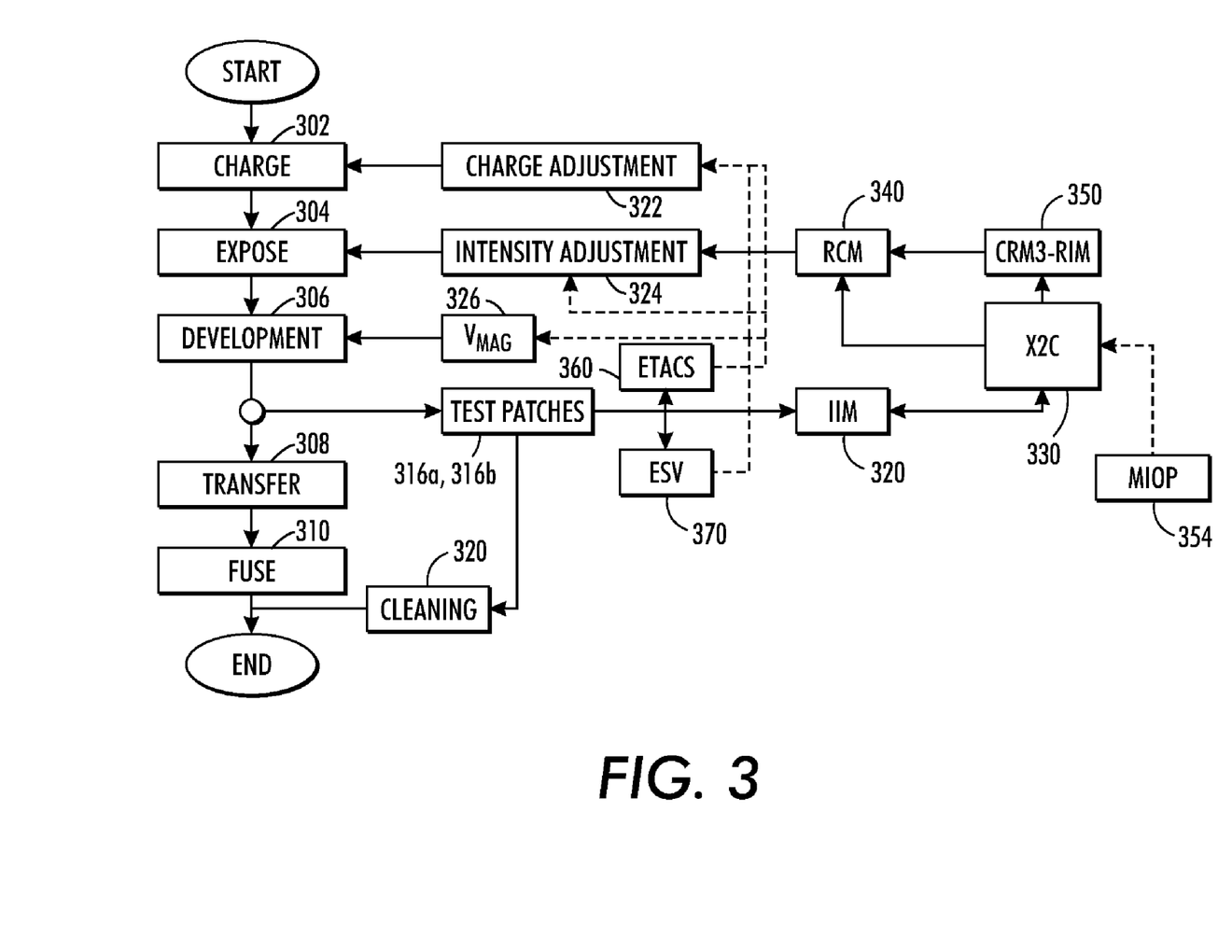
FIG. 3 illustrates a system for correcting streak defects according to an exemplary embodiment of this disclosure.

With reference to FIGS. 2 and 3, a printing machine is illustrated generally at 8 according to an exemplary embodiment of this disclosure. The printing machine 8 is a single pass multi-color digital printer, also known as a xerographic or electrophotographic image forming device. The digital printer 8 described herein is a Xerox iGen4™ Digital Production Press and is provided by way of example, it should be appreciated that the methods for compensating for image streaks, described herein, are applicable to other image forming devices using suitable xerographic, liquid ink xerographic, aqueous ink jet, and solid ink jet marking technologies.

The digital printer 8 employs a photoconductive/photoreceptor (P/R) belt 10 supported by a plurality of backer rollers or backer bars 12. The P/R belt 10 is arranged in a vertical orientation. P/R belt 10 advances in the process direction shown by 14 to move successive portions of the external surface of P/R belt 10 sequentially beneath the various processing stations disposed about the path of movement thereof.

The printing machine architecture can include five image recording stations, indicated generally by the reference numerals 16, 18, 20, 22, and 24, respectively, each corresponding to a different color separation. Initially, belt 10 passes through image recording station 16. Image recording station 16 includes a charging device and an exposure device. The charging device includes a corona generator 26 that charges the exterior surface of P/R belt 10 to a relatively high, substantially uniform potential during a charging operation as shown at 302 in FIG. 3. After the exterior surface of P/R belt 10 is charged, the charged portion thereof advances to the exposure device. The exposure device includes a raster output scanner (ROS) 28, which illuminates the charged portion of the exterior surface of P/R belt 10 to record a first electrostatic latent image thereon during an exposure operation as shown at 304. Alternatively, a light emitting diode (LED) may be used as the illumination source in the ROS device.

This first electrostatic latent image is then developed by developer unit 30 during a development operation 306. Developer unit 30 deposits toner particles of a selected first color on the first electrostatic latent image. After the first color toner image has been developed on the exterior surface of P/R belt 10, belt 10 continues to advance in the process direction of arrow 14 to image recording station 18.

Image recording station 18 includes a charging device and an exposure device. The charging device includes a corona generator 32 which recharges the exterior surface of P/R belt 10 to a relatively high, substantially uniform potential during a charging operation 302. The exposure device includes a ROS 34 which illuminates the charged portion of the exterior surface of P/R belt 10 to selectively record a second electrostatic latent image thereon during an exposure operation 304. This second electrostatic latent image corresponds to the regions to be developed with second color toner particles, such as magenta toner particles. This second electrostatic latent image is now advanced to the next successive developer unit 36.

Developer unit 36 deposits magenta toner particles on the electrostatic latent image during a development operation 306. In this way, a magenta toner powder image is formed on the exterior surface of P/R belt 10. After the magenta toner powder image has been developed on the exterior surface of P/R belt 10, P/R belt 10 continues to advance in the process direction of arrow 14 to image recording stations 20, 22 and 24.

Image recording stations 20, 22 and 24 also include charging devices and exposure devices similar to those described above. The charging devices includes corona generators 38, 44 and 50 which recharge the photoconductive surface to a relatively high, substantially uniform potential during charging operations 302. The exposure devices also include ROS 40, 46 and 52 respectively, which illuminate the charged portion of the exterior surface of P/R belt 10, during exposure operations 304, to selectively dissipate the charge thereon for recording third, fourth and fifth electrostatic latent images corresponding to the regions to be developed with corresponding color toner particles, such as yellow, cyan and black toner particles, respectively.

The third, fourth or fifth electrostatic latent images are then advanced to their respective developer units 42, 48, or 54 which deposits yellow, cyan or black toner particles on the exterior surface of P/R belt 10, during development operations 306, to form toner powder images thereon thereby developing the third, fourth and fifth electrostatic latent images. These toner particles may be partially superimposed and registered with the previously formed powder images. The black toner particles may be totally superimposed and registered with the previously formed powder images.

In this way, a multi-color toner powder image is formed on the exterior surface of P/R belt 10. Thereafter, P/R belt 10 advances the multi-color toner powder image to a transfer station, indicated generally by the reference numeral 56 for the transfer operation 308.

At transfer station 56, a receiving medium, i.e., paper, is advanced from stack 58 by sheet feeders and guided to transfer station 56. At transfer station 56, a corona generating device 60 sprays ions onto the back side of the paper. This attracts the developed multi-color toner image from the exterior surface of P/R belt 10 to the sheet of paper. Stripping assist roller 66 contacts the interior surface of P/R belt 10 and provides a sufficiently sharp bend thereat so that the beam strength of the advancing paper strips the sheet of paper from P/R belt 10. A vacuum transport moves the sheet of paper in the direction of arrow 62 to fusing station 64 for the fusing operation 310.

Fusing station 64 includes a heated fuser roller 70 and a backup roller 68. The back-up roller 68 is resiliently urged into engagement with the fuser roller 70 to form a nip through which the sheet of paper passes. In the fusing operation, the toner particles coalesce with one another and bond to the sheet in image configuration, forming a multi-color image thereon. After fusing, the finished sheet is discharged to a finishing station where the sheets are compiled and formed into sets which may be bound to one another. These sets are then advanced to a catch tray for subsequent removal therefrom by the printing machine operator.

One skilled in the art will appreciate that while the multi-color developed image has been disclosed as being transferred to paper, it may be transferred to an intermediate member, such as a belt or drum, and then subsequently transferred and fused to the paper. Furthermore, while toner powder images and toner particles have been disclosed herein, one skilled in the art will appreciate that a liquid developer material employing toner particles in a liquid carrier may also be used.

Figure 4:
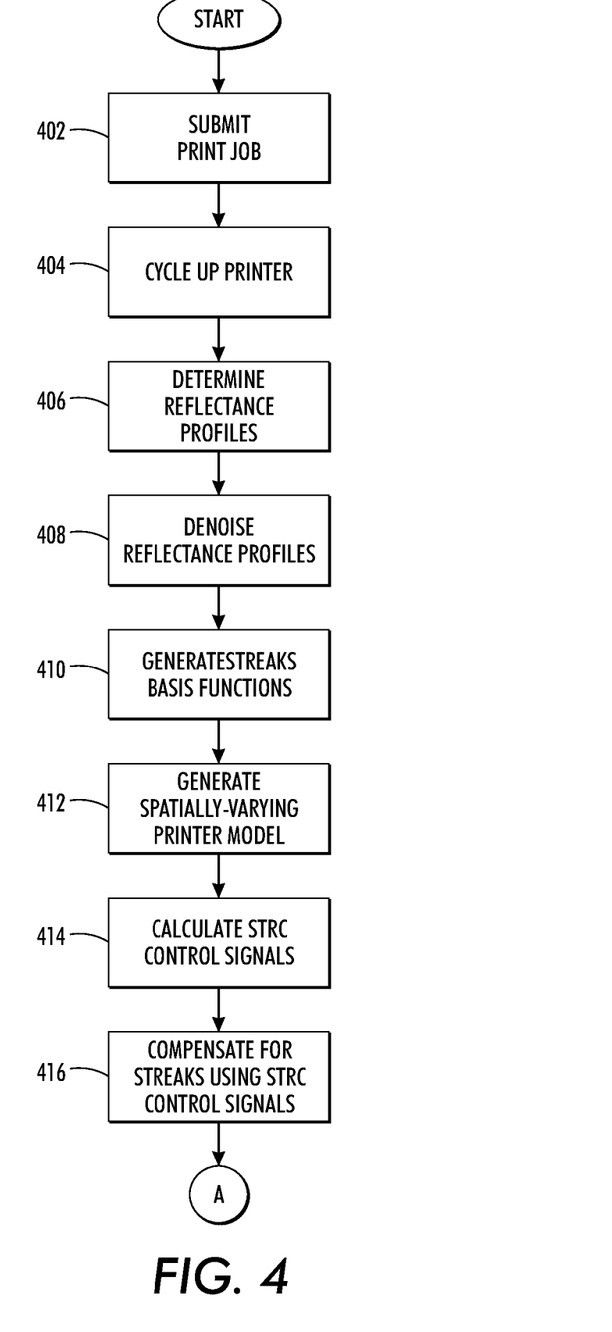
FIG. 4 illustrates a process for correcting streak defects at machine start up according to an exemplary embodiment of this disclosure.
Figure 5:
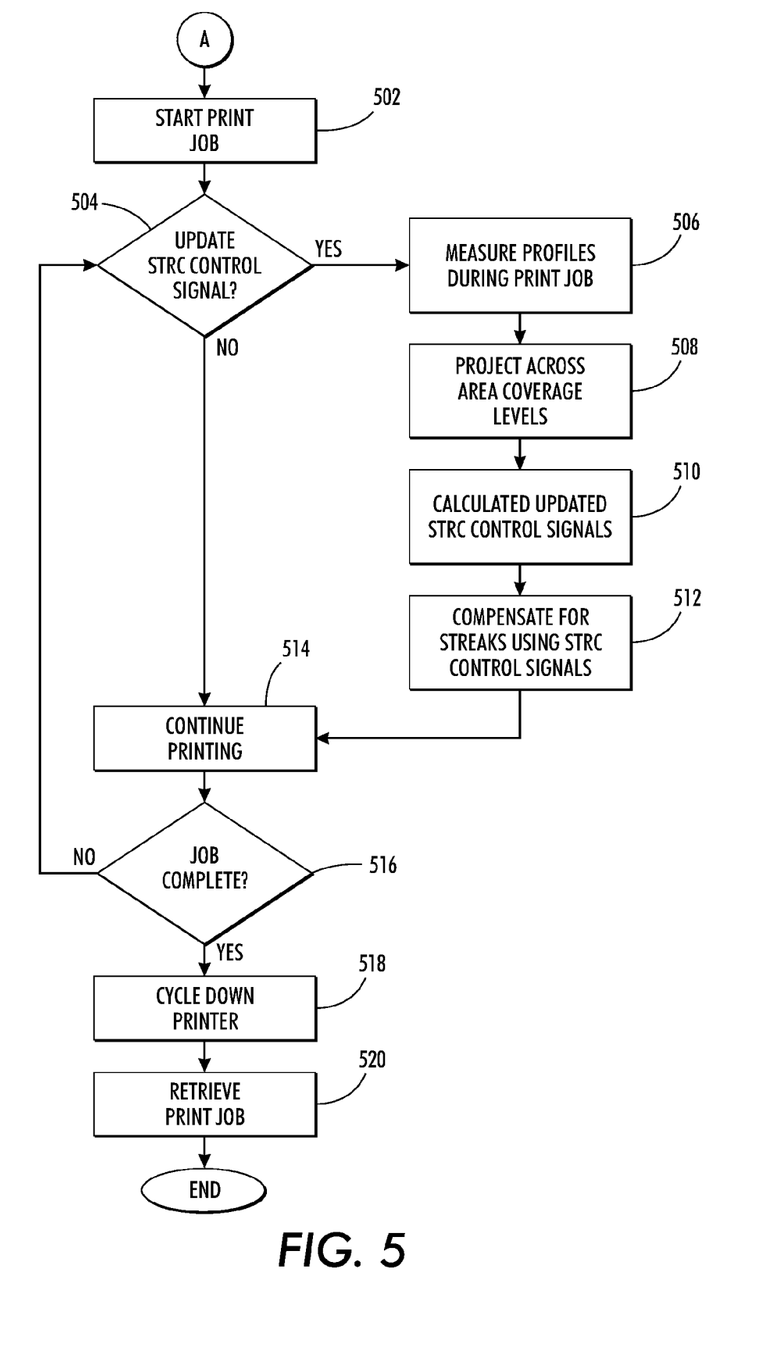
FIG. 5 illustrates a process for correcting streak defects at machine runtime printing according to an exemplary embodiment of this disclosure.

Referring now to FIGS. 3-5, exemplary embodiments of a digital printer using a method of streak compensation utilizing a spatially varying Printer Model and Run Time updates to generate Spatially Varying Tone Reproduction Curves (STRCs) is illustrated. A full width array sensor is used to measure streak profiles and the STRCs are used as actuators to compensate for streaks. Streak profile measurements taken at a limited number of area coverage levels combined with a Printer Streaks Basis Function Model are used to estimate and project the streak behavior at all area coverage levels and at all inboard-to-outboard spatial locations. The projection is then used in a pixel-wise error feedback control scheme to drive each profile to a desired shape, usually flat, thereby compensating for streaks. In one example, the Printer Streaks Basis Function Model is estimated based on data obtained at cycle up. Other examples use a special set of fixed basis functions. Control and mathematical operations in the steps described in FIGS. 4 and 5 are performed by a signal processing and control unit, such as X2C 330 shown in FIG. 3, which can also be referred to as a STRC application control module. The signal processing and control unit 330 can be one or more microcontrollers, microprocessors, central processing units (CPUs), graphical card CPUs, graphical processing units (GPUs), application specific integrated circuits (ASICs), field programmable gate arrays (FPGAs) and other processor computing devices.

Referring now to FIG. 4, a print job is submitted at 402 by a user and the printer is cycled up in a start up operation at 404. Machine startup mode, also known as cycle up or Cycle Up Conversion (CUC), typically occurs prior to and in preparation for runtime mode wherein the machine is ready for operation and during which print jobs are performed. Motors, rolls, and belts start to turn and the machine prepares for printing.

Reflectance profiles are determined at 406 during the cycle up procedure 404. The reflectance profiles for several area coverage levels for each color are obtained. In the example described herein, 16 area coverage levels are uniformly sampled from 2% area coverage to 100% area coverage, though other numbers of area coverage levels can be used.

As used herein, the term "Area Coverage" for a test image, also referred to as a "patch", generated on a substrate is the percentage of pixels per unit area in the single color separation input image that are turned on for that patch. Since this is a percentage, it varies from 0% to 100%. An area coverage value of 0% refers to no input image pixels turned on for the patch, thus no toner on the paper, and the output density of the patch on the paper is equal to the original paper density. An area coverage value of 100% refers to all the input image pixels turned on for the patch, thus a solid patch of toner results on the paper, and the output density of the patch on the paper is equal to the solid density. Often the term "Grey Level" is used to describe the input patch image. Typically there is a one-to-one mapping between grey level and area coverage. Many printing systems use 8-bit inputs, so a grey level of 0 is equivalent to an area coverage of 0% and a grey level of 255 is equivalent to an area coverage of 100%. "Area Coverage" is also often referred to as "Digital Area Coverage" to emphasize that it is the percentage of pixels turned on in the digital input image to the printing system, and does not refer to an output quantity such as density.

US Publication No. 2006/0209101 for "Systems and Methods for Measuring Uniformity in Images" by Mizes, which is incorporated herein by reference in its entirety, teaches a way to obtain reflectance profiles. In one example which should not be considered limiting, test images in the form of patches 316*a* are generated on a sensing substrate such as the P/R belt 10 at 402 utilizing one or more of the image recording stations 16, 18, 20, 22, and 24 performing one or more charging 302, exposing 304 and developing 306 operations in manners similar to those described above. In another example, the test images 316*a* are generated on an intermediate belt or drum sensing substrate. In another example, the test images 316*a* are printed on output media sensing substrate. The example test images 316*a* have a process direction dimension and span the entire width of the cross process direction. In the example provided herein, which should not be considered limiting, the test images 316*a* have a process direction dimension of 1 inch.

The reflectivity of these test patches 316*a* are then measured with an in situ sensor 100, shown in FIG. 2, having a field of view which spans the entire width of the cross process direction. The sensor 100 has a speed of capture sufficient for capturing the full 1 inch process direction dimension of the patch 316a as the patch passes the sensor. The captured signal can then be averaged in the process direction, yielding a signature profile that spans the full cross process direction width. In a typical embodiment the sensor 100 may be a full width array sensor. However, in another embodiment the sensor 100 may be a reduction optics camera sensor or a scanning spot sensor. Sensing may be monochrome, or in color parameters. In typical embodiments the measurement is made on a photoreceptor 10, such as a drum or belt, or on an intermediate drum or belt. In alternate embodiments, the measurement is made in situ on the final output media.

These reflectance profiles represent the current streak realization (generation) of the printer. In one example, 16 area coverage levels are printed for each color printed by the printer 8, such as for example cyan, magenta, yellow and black for CMYK printers, though other numbers can be printed. These 16 levels are roughly equally spaced across the range of tones that the printer can print.

To further describe the method for performing model based projection for run-time streak correction, the following mathematical quantities are defined: $P_j(i)$ is the relative reflectance as measured by the full width sensor for area coverage index j and pixel index i in the inboard-to-outboard direction. It is the i element of profile j, $N_{AC}$ is the total number of area coverage levels in the patch data, which is 16 in the preferred embodiment. $N_{pixels}$ is the total number of pixels in the inboard-to-outboard direction. By way of example, a 15 inch wide full wide sensor is used having a resolution of 600 samples per inch. The data is decimated in the inboard-to-outboard direction by a factor of 8 which results in approximately 1200 pixels. AC(j) is the area coverage level used for area coverage index j in the patch set.

For each area coverage used, the relative reflectance values for each pixel can be gathered together to form a profile row vector, as described in Equation 1.

$$\tilde{p}_j \equiv [P_j(1) P_j(2) \ldots P_j(N_{pixels})] \quad (1)$$

Where $\tilde{p}_j$ is the sensor profile for area coverage AC(j) before the denoising process is applied.

The mean value of each profile is described in Equation 2.

$$\mu_P(j) \equiv \mu(\tilde{p}_j) = \frac{1}{N_{pixels}} \sum_{i=1}^{N_{pixels}} P_j(i) \quad (2)$$

The profile row vectors depicting the profiles for all the area coverage levels, less their mean values, are gathered together to form a profile matrix and mean vector as described in Equations 3 and 4.

$$R \equiv \begin{bmatrix} \tilde{p}_1 - \mu_P(1) \\ \tilde{p}_2 - \mu_P(2) \\ \vdots \\ \tilde{p}_{N_{AC}} - \mu_P(N_{AC}) \end{bmatrix} \quad (3)$$

$$\mu_P \equiv \begin{bmatrix} \mu_P(1) \\ \mu_P(2) \\ \vdots \\ \mu_P(N_{AC}) \end{bmatrix} \quad (4)$$

The reflectance profiles are denoised at 408. Due to process noises and halftoning, the reflectance profiles may contain unwanted signals referred to as noise. Standard signal processing techniques to remove noise from the profiles can be applied.

In one example, a singular value decomposition based denoising method is applied at 408. The matrix R has dimensions $N_{AC}$ rows by $N_{pixels}$ columns, and in the example provided herein this is 16 rows×1200 columns. The denoising process involves determining the first few, such as 3 for example, left singular vectors of the matrix R. Note that these vectors are column vectors. This can be efficiently performed by forming a covariance matrix using Equations A through E, then using what is known as the Power Method as described in G. H. Golub and C. F. Van Loan, *Matrix Computations*, Third Edition, The Johns Hopkins University Press, 1996 which is incorporated by reference herein in its entirety, to determine the eigenvectors of the covariance matrix. Equation (A) represents the definition of the covariance matrix across area coverage levels. A direct calculation of the covariance matrix as described in Equation (A) is prohibitively expensive and cannot be computed in a reasonable period of time using a low cost computational platform. Thus, first Equations (B) and (C) are used to directly calculate the diagonal elements and first off diagonal elements of the covariance matrix. Then Equations (D), a bootstrapping equation, and (E), a symmetry equation, are used with the prior calculation of the diagonal and first off diagonal elements to calculate all other elements of the covariance matrix. The bootstrapping occurs as follows. First, Equation (D) is used with the diagonal and first off diagonal elements to calculate the second off diagonal elements. Then Equation (D) is used with the first off diagonal elements and the second off diagonal elements to calculate the third off diagonal elements. Similarly, Equation (D) is again used with the second off diagonal elements and the third off diagonal elements to calculate the forth off diagonal elements. This pattern continues until elements on all the diagonals of the matrix are calculated. The initial vectors used in the Power Method are formed using the Discrete Cosine Transform basis functions modulated element by element by the square root of the terms in Equation B. In Equations (B) through (E) the first variable in the parenthesis represents the row number of the respective matrix, while the second variable in the parenthesis represents the column number of the respective matrix.

$$C \equiv \frac{1}{N_{pixels}} RR^T \quad (A)$$

$$C(i, i) = \frac{1}{N_{pixels}} \sum_{j=1}^{N_{pixels}} [R(i, j)]^2 \quad (B)$$

$$C(i, i+1) = \frac{1}{N_{pixels}} \sum_{j=1}^{N_{pixels}} R(i, j) R(i+1, j) \quad (C)$$

$$C(i, l) = \frac{C(i, k) C(k, l)}{C(k, k)}, \min(i, l) < k < \max(i, l) \quad (D)$$

$$C(i, l) = C(l, i) \quad (E)$$

The eigenvectors of the covariance matrix are the left singular vectors of R. Let $N_L$ represent the number of left singular vectors chosen for the denoising process. In the example described herein $N_L$=3. Each left singular vector is represented by $u_l$, has dimension $N_{AC}$, and is described by Equation 5.

$$u_l = \begin{bmatrix} u_l(1) \\ u_l(2) \\ \vdots \\ u_l(N_{AC}) \end{bmatrix} \quad (5)$$

Then Equation 6 shows the calculation used to determine the denoised profiles.

$$\begin{bmatrix} p_1 \\ p_2 \\ \vdots \\ p_{N_{AC}} \end{bmatrix} = \left(\mu_p \bullet 1_{1 \times N_{pixels}}\right) + \left(\sum_{l=1}^{N_L} u_l \bullet u_l^T\right) \bullet R \quad (6)$$

The term $1_{1 \times N_{pixels}}$ represents a vector whose values are all equal to 1. It is used in a vector outer product with $\mu_p$ to add back the mean values.

In other examples, standard convolution or Fourier based filtering may be used to remove noise from the profiles at 408.

Printer streaks basis functions are then generated at 410. It has been found that the singular value decomposition based denoising process, 408 described above, has a positive side effect of automatically producing basis vectors that efficiently represent the streaks currently being produced by the printer as measured by the sensor in terms of the streak profiles. The basis function set is described in Equation 7.

$$U = \{u_1, u_2, \ldots, u_{N_L}\} \quad (7)$$

In an alternate embodiment, the basis vectors may be fixed basis vectors. Sinusoidal functions that have been multiplied by a Gaussian function to ensure that they vanish at the end points may also be used to form the basis vectors. As in Equation 5, the independent variable for sinusoidal and Gaussian functions used to generate the basis vectors is the area coverage indices. The sinusoidal functions are harmonically related starting with a DC term. To form the first basis vector, the DC term is multiplied by a Gaussian functions and sampled such that the resulting vector element for 0% area coverage and 100% area coverage is zero, and whose peak value is at the basis vector element corresponding to 50% area coverage. The second basis vector is formed using a sine function, whose period is equal to the number of area coverage indices used, multiplied by the Gaussian function. The sine function associated with the second basis vector completes one cycle across the entire 0% to 100% area coverage span. The third basis vector is formed using a sine function, whose period is equal to one half the number of area coverage indices used, multiplied by the Gaussian function. The sine function associated with the third basis vector completes two cycles across the entire 0% to 100% area coverage span. Other basis vectors, if used, are defined similarly.

The denoised reflectance profiles, which are reflectance values as a function of input area coverage and inboard-to-outboard spatial location, are then used to generate a spatially-varying printer model at 412. In one example, this is performed as a simple linear interpolation of the denoised reflectance profiles across area coverage on a per pixel index basis. In other examples, higher order polynomial or spline based interpolation is used. The interpolation is modified so that the resulting model is monotonic in reflectance as a function of area coverage for each pixel index along the entire cross-process direction width. In an exemplary embodiment this is performed by starting at the reflectance for 2% area coverage for each pixel index across the cross-process dimension and adjusting the reflectance values of the denoised profiles for each increasing area coverage so that the resulting adjusted reflectance values as a function of area coverage are monotonic. Thus, since the resulting reflectance values, which are the nodes of the interpolation, are monotonic as a function of area coverage, and linear interpolation in the area coverage dimension is used, the resulting spatially varying printer model is also monotonic as a function of area coverage for each pixel index along the whole cross-process direction width. The Spatially-Varying Printer Model is stored for use in the cycle-up procedure, shown in FIG. 4, as well as in the run time procedure, shown in FIG. 5.

STRC control signals are then calculated at 414. The reflectance goals, or aim reflectance, for each input area coverage is determined. The reflectance goal for each area coverage is the reflectance value to which the system is to drive the output for that input area coverage. A reflectance goal for each of the area coverage levels used to produce the reflectance profiles is determined. In one example, the reflectance goal for each reflectance profile associated with each input area coverage is determined by averaging the reflectance profile at the cross-process direction location where a process controls sensor is located. This insures that the streaks compensation system and the process controls system work without interfering with each other to reduce streaks while maintaining proper average density across the cross-process dimension of the reflectance profile. The number of pixels at the process controls sensor cross-process direction location used is a value that is equivalent to the dimension of the process controls sensor field of view plus a few pixels on either side to reduce noise. In an exemplary embodiment this could be the number of pixels equivalent to 15 mm.

In an alternate embodiment, the reflectance goal for each reflectance profile could be determined by averaging the whole cross-process width of the reflectance profile. In another alternate embodiment, the reflectance goal for each reflectance profile could be a fixed reflectance value for each input are coverage, specified by the operator or an external system.

The reflectance goal and the spatially varying printer model are then used to determine the input area coverage required for each pixel index of each profile to reach its reflectance goal at its output. Since in an exemplary embodiment, the spatially-varying printer model is insured to be monotonic, simple linear inverse function interpolation is used. The printer model is inverse interpolated for each input area coverage to determine the area coverage required to result in the aim reflectance value at each inboard-to-outboard location. The resulting set of area coverage remapping values for each profile for each pixel index define a STRC. The STRCs at the 16 input area coverage levels are thus defined.

In an exemplary embodiment, high resolution reflectance profiles in the cross-process direction may result in more than 2000 STRCs. This may be too many for transmission, storage, and processing in real time application to image pixels. The STRCs are therefore compressed using a singular value decomposition algorithm, resulting in a mean vector (which is 16 elements in length), 3 basis vectors (which are 16 elements each), and 3 sets of weights (each of which is about 1200 elements, representing the 1200 inboard-to-outboard locations). The STRC control signals are to be defined for each gray level. In an exemplary embodiment this is from 0 to 255, and simple linear interpolation is used to expand the mean and the basis vectors from 16 elements to 256 elements each with the constraint that the basis vectors are zero at the high and low extremes. In alternate embodiments, polynomial or spine based interpolation can be used in the expansion.

The STRC control signals including the mean vector, the three basis vectors, and the weights are then applied to subsequently printed images to compensator for (i.e. correct for) streaks at 416. Referring again to FIG. 3, the Contone Rendering Module (CRM) shown at 350, uses the STRCs to modify the input image "contone" ("continuous tone") data, to derive compensated gray levels to correct the spatial non-uniformities, such as is taught by US Publication No. 2006/0077488 A1 for "Methods and systems achieving print uniformity using reduced memory or computational requirements" by Yeqing, et al., which is hereby incorporated herein by reference in its entirety.

The output of CRM 350 is used in a ROS interface module (RIM) 350 which reorganizes and synchronizes the binary image data for synchronous delivery to the ROS laser in cooperation with, for example, the motion of photoreceptor 10 as controlled by the ROS Control Module (RCM) 340.

The image path elements can be controlled by a marker I/O processor (MIOP) 354 which can provide timing signals and other control functions thereto. The xerographic image forming machine 8 can include other sensors for making charge adjustments 322 to the charging operation 302, intensity adjustments 324 to the ROS used in the exposure operation 304 and adjustments to VMAG made to the developing operation 306 for improving the consistency of the images formed on the P/R 10. Such sensors can include an infrared densitometer, such as an enhanced toner area coverage sensor (ETACS) 360, for measuring the gray level in the white space regions of a developed image on the P/R and an electrostatic voltmeter (ESV) 370 for measuring the potential on the P/R.

The STRCs are used to actuate the ROS during the exposure operation 304 to compensate for (or correct) the spatial non-uniformities (streaks) thereby producing streak-corrected toner images at 416. These toner images can be transferred to a substrate such as paper etc. to produce streak-corrected print images as described above.

Referring now to FIG. 5, a Print Job is started at 502. Upon completion of the Cycle-Up procedures shown in FIG. 4, the print job starts in a standard manner. The STRCs that were calculated at 414 in the Cycle-Up procedure of FIG. 4 are applied to the print job images to compensate for streaks during the print job.

During the print job, the STRC control signals can be updated in a streak control signal update cycle at 504. In the example provided herein, two belt revolutions of interdocument zones out of every six belt revolutions can be used to update the control signal, though other numbers can be used. Thus, in this example, the control signal gets updated every 66 prints in 11 pitch mode.

In an exemplary embodiment, patches 316b having a length dimension of 1 inch in the process direction and a width in the cross-process direction which spans the full printing width are printed in interdocument zones. The system determines the same area coverage levels as in the Cycle-Up procedure by actually measuring a subset and performing a projection step as described below. The system measures a first subset, such as for example 4 out of the 16 profiles before it performs an update. In an alternate embodiment, very short patches in the process direction having a width in the cross-process direction spanning the full printing width are printed at the lead edge, or trail edge, or both lead and trail edges of a customer output print on a part of the paper that is to be trimmed off or otherwise hidden from view in the final document. In another alternate embodiment, the patches are printed in the customer zone and the machine skips a pitch in order to make the measurements.

Reflectance profiles are measured during the print job at 506. During a belt revolution where a control update is to occur, strips are printed in the interdocument zone and are measured by the sensor. The system then generates reflectance profiles which represent the current streak performance of the printer. These measured reflectance profiles, which have had the previously calculated Spatially-Varying TRCs applied to them, are used to update the Spatially-Varying TRCs to compensate for time-varying streaks.

Since the interdocument zones are small, and there are only a limited number of them available for control updates, the complete set of 16 input area coverage levels are not measured in one control update cycle 504. Instead, a subset of the entire set of area coverage levels are measured. Let $N_K$ represent the number of levels that are measured in a current control update cycle. For the example embodiment described herein, $N_K=4$ area coverage levels are used, though it should be appreciated that other number of levels can be used. The 4 area coverage levels are spread across the TRC such that at least one level is chosen from the highlight, one level chosen from the midtone, and one level from the shadow regions of the TRC. The fourth level can be from any region of the TRC. In one example, the system uses a different subset of 4 levels of the set of 16 levels on each subsequent update cycle 504, where after 4 update cycles, the system cycles through the complete set of 16 levels. Though in other examples, not every area coverage level may be directly measured during a print job. From the original $N_{AC}=16$ area coverage levels, let the variable $j_k$ represent the area coverage level indices used during the current update cycle. Then $AC(j_k)$ represents the area coverage values used during the current update cycle. For clarity, Equation 8 describes the relationships between the indices j, k, and $j_k$:

$$J=\{1, 2, \ldots, N_{AC}\} \subset Z^+$$

$$K=\{1, 2, \ldots, N_K\} \subset Z^+$$

$$N_K < N_{AC}$$

$$j \in J$$

$$k \in K$$

$$j_k \in J$$

$$\{j_1, j_2, \ldots, j_{N_K}\} \subset J \qquad (8)$$

Since only 4 area coverage levels are directly measured during a control update cycle, the other non-directly measured levels are inferred using the Printer Streaks Basis Functions to project across area coverage to cover all levels. Streaks occur in printing systems such that they have a defined pattern across area coverage. Typically the streak amplitude is highest in the midtone region and has lower amplitude at the highlights and the shadows. This projection step takes advantage of any pattern that exists.

First, mean vector values are removed from measured reflectance data.

$$\tilde{y}(i)=y_k(i)-\mu_P(j_k) \qquad (9)$$

where $y_k(i)$ is the measured data for measured area coverage level index k at inboard-to-outboard location i and $\mu_P(j_k)$ is the $j_k$ element of vector $\mu_P$.

Next, the data is gathered together into a column vector across the measured area coverage levels for each inboard-to-outboard location.

$$Y(i) = \begin{bmatrix} \tilde{y}_1(i) \\ \tilde{y}_2(i) \\ \vdots \\ \tilde{y}_{N_K}(i) \end{bmatrix} \quad (10)$$

Next, the elements of the Printer Streaks Basis Vectors that correspond to the measured area coverage levels are gathered.

$$\Phi = \begin{bmatrix} u_1(j_1) & u_2(j_1) & u_3(j_1) \\ u_1(j_2) & u_2(j_2) & u_3(j_2) \\ \vdots & \vdots & \vdots \\ u_1(j_{N_K}) & u_2(j_{N_K}) & u_3(j_{N_K}) \end{bmatrix} \quad (11)$$

In the preferred embodiment 1 to 3 basis vectors can be used. Note that the number of basis vectors used must be less than or equal to $N_K$, the number of measurements available, and is also less than or equal to $N_L$, the number of basis vectors in the Printer Streaks Basis Vector Model. The basis vectors should be used in order of their ability to represent the streaks. This order is defined by the singular values and is automatically determined if the Power Method of basis vector determination is used. Note that the same regression matrix, $\Phi$, is used for all inboard-to-outboard locations, i.

Next, the following system of linear equations are solved for $\alpha(i)=[\alpha_1(i)\alpha_2(i)\alpha_3(i)]^T$, where i represents each inboard-to-outboard location:

$$\Phi^T\Phi\alpha(i)=\Phi^T Y(i) \quad (12)$$

This can be performed using a Gramm-Schmidt orthogonalization procedure on the columns of $\Phi$ resulting in $\Phi_{GS}{}^T\Phi_{GS}=I$, as described in G. H. Golub and C. F. Van Loan, *Matrix Computations*, Third Edition, The Johns Hopkins University Press, 1996, which is hereby incorporated by reference herein in its entirety. In alternate embodiments Gaussian Elimination or direct matrix inversion may be used.

The projection for any area coverage level, j, then becomes:

$$\hat{P}_j(i) = \mu_P(j) + \sum_{k=1}^{3} u_k(j)\bullet\alpha_k(i), \; i = 1, 2, \ldots, N_{pixels} \quad (13)$$

This projection is performed for all 16 area coverage levels at 508. This projection is then used to represent the current streak performance across all area coverage levels in the subsequent steps to produce the control signal and the streaks correction signal. Note that this procedure will reduce noise in the profiles for the measured area coverage.

In alternate embodiments, the projection at 508 can include filtering and smoothing, spline based curve fitting, or other curve fitting methods. Filtering and smoothing entails multiplying the measured data by scale factors and adding up the results to produce the filtered and smoothed output value from the limited amount of measured data. Each different area coverage level uses different scale factors, resulting in a complete set of projected profiles. Spline based curve fitting uses cubic splines or B-splines to fit the measured data to spline based models. The spline models are then evaluated at the unmeasured profile area coverage levels to produce the projected profiles. Other curve fitting methods include using higher order spline models and polynomial models instead of cubic spline models or B-spline models to fit the measured data. As in the case for cubic splines and B-splines, the models are then evaluated at the unmeasured profile area coverage levels to produce the projected profiles.

Update STRC Control Signals are then calculated at 510. Once the profiles are determined, the method proceeds to perform proportional and integral control action in order to drive the profile response to a desired shape—usually flat as described in U.S. application Ser. No. 12/277,594 previously incorporated by reference above. The STRCs used to compensate for the streaks are compressed into a form that results in a mean vector, basis vectors, and weights for each inboard-to-outboard pixel location. Each pixel on each profile becomes a standard error feedback control system. Standard control theory can then be applied to define an update control signal. In an exemplary embodiment, a Proportional Error Plus Integral Error update signal is defined with a corresponding Proportional Error Gain and an Integral Error Gain, Both Gains are set for minimizing noise injection while maximizing responsiveness to changing streaks. In one example which should not be considered as limiting, both Gains are set to 0.2. As in standard PI controllers, the integrator is initialized to 0 when the control loop starts. Further, integrator windup is avoided by disabling the integrator when the error does not decrease on successive iterations of the control loop. This update is in the reflectance space so as to deliver equal convergence rate for all area coverage levels in the presence of non-linear open loop system response.

The updated STRC control signals including the mean vector, basis vectors, and weights are then used to compensate for streaks in run time prints producing streak corrected print job images at 512, in a manner as described above at 416, while printing is continued at 514.

The printer 8 continues printing in a normal manner at 514 until another STRC control signal update cycle is performed at 504 or until the job completes at 516, after which the printer is cycled down at 518 and another print job is retrieved at 520. If another STRC control signal update cycle is performed at 504, a different subset of the set can be used and this can be repeated until each area coverage is directly measured and used in the projection step at 508.

Figure 6:
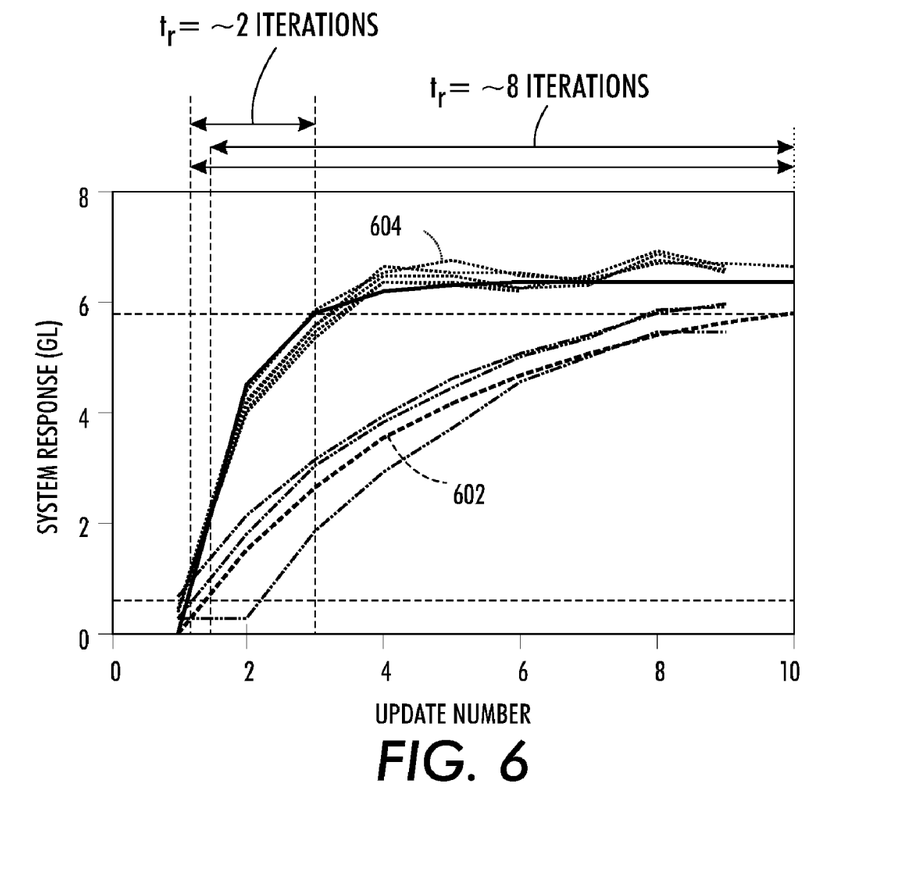
FIG. 6 illustrates the performance of an exemplary embodiment of this disclosure.

Referring now to FIG. 6, an experiment was performed where a step streak disturbance is injected into the system after cycle-up convergence and the transient response of the run time controller was recorded. Two methods were compared. The results for a method not using the Projection step 508, are shown at 602. In that method, at each control update, 4 new measured profiles are mixed with 12 old measured profiles to define the profiles used to generate the control signals. The results for a method using the Projection step 508, are shown at 604.

In FIG. 6, the x-axis is the control update number and the y-axis is the resulting spatial TRC change. Note that machine instrumentation limitations dictated that the spatial TRC value, itself, was the easiest signal to measure in order to evaluate the transient response of the controllers. The disturbance injected was such that a compensating spatial TRC change of slightly more than 6 units (out of 256 levels) was required to reject the disturbance. The change in reflectivity should be approximately proportional to the change in spatial TRC value. For transient response evaluation of control systems, the Rise Time is used as a performance metric. The Rise Time is defined to be the amount of time (or number of iterations in a discrete-time system) for the system to traverse from 10% of its final value to 90% of its final value when reacting to a step disturbance. In the Figure, the 10% and 90% levels are indicated by the horizontal dashed black lines. The Rise Time for the previous method is indicated by the time between the vertical dash-dot green lines, and is approximately 8 iterations. The Rise Time for the system and method described herein is indicated by the time between the vertical dashed black lines, and is approximately 2 iterations. The data indicates that the method using the Projection step 508 to calculate the update control signals at 510 results in a 4× better transient performance than the previous method.

A faster transient response enables the system to react to streaks that are left behind due to incomplete streak compensation at cycle-up convergence, and enables schemes where a faster cycle-up convergence is used (which may leave behind some streaks that are then rapidly compensated during the first few iterations of the run time controller. This enables an improvement in cycle-up convergence time, while sacrificing little streak compensation performance after run time iterations have been performed. In addition, a faster transient response enables the system to quickly react to "pop-up" and dynamic streaks—improving the system image quality over long print runs.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of printer streak compensation comprising:
    constructing a printer streaks basis function model during printer cycle up;
    printing a set of $N_{AC}$ test images during a print job printing print job images, each test image having a different area coverage level such that the area coverage levels of the set are spaced across the range of tones that the printer can print; and
    performing a steak control signal update cycle including:
        directly measuring the reflectance of a subset of the set of test images having $N_K$ of the test images representing area coverage levels including a shadow region, a midtone and a highlight region of area coverage level, where $N_K < N_{AC}$,
        projecting across the area coverage levels of all of the test images by inferring the reflectances of the test images not directly measured during the current streak control signal update cycle using the measured reflectances of the subset of test images and the printer streaks basis function model,
        updating the reflectance profiles for all of the test images,
        calculating updated spatially varying tone reproduction control signals using the updated reflectance profiles, and
        printing streak-corrected print job images using the updated spatially varying tone reproduction control signals.

2. The method of claim 1, further comprising performing subsequent streak control signal update cycles during the print job, each streak control signal update cycle including directly measuring the reflectance of a different subset of test images in the set $N_{AC}$ and using the subset of measured reflectances in the projecting step of the associated streak control signal update cycle.

3. The method of claim 1, wherein the projecting includes removing mean vector values from measured reflectance data of the subset of test images such that $$\tilde{y}_k(i) = y_k(i) - \mu_P(j_k)$$

where $y_k(i)$ is the measured data for measured area coverage level index k at inboard-to-outboard location i and $\mu_P(j_k)$ is the $j_k$ element of vector $\mu_P$, which is a vector whose elements comprise the mean reflectance across inboard-to-outboard locations for each area coverage level.

4. The method of claim 3, wherein the reflectance data is gathered together into a column vector across the measured area coverage levels for each inboard-to-outboard test image location such that $$Y(i) = \begin{bmatrix} \tilde{y}_1(i) \\ \tilde{y}_2(i) \\ \vdots \\ \tilde{y}_{N_K}(i) \end{bmatrix}.$$

5. The method of claim 4, wherein elements of printer streaks basis vectors that correspond to the measured area coverage levels are gathered such that $$\Phi = \begin{bmatrix} u_1(j_1) & u_2(j_1) & u_3(j_1) \\ u_1(j_2) & u_2(j_2) & u_3(j_2) \\ \vdots & \vdots & \vdots \\ u_1(j_{N_K}) & u_2(j_{N_K}) & u_3(j_{N_K}) \end{bmatrix}$$

wherein the number of basis vectors used is less than or equal to $N_K$ and less than or equal to $N_L$ where $N_L$ is the number of basis vectors in the printer streaks basis vector model.

6. The method of claim 5 further comprising solving the system of linear equations $$\Phi^T \Phi \alpha(i) = \Phi^T Y(i)$$

for $\alpha(i) = [\alpha_1(i)\alpha_2(i)\alpha_3(i)]^T$, where i represents each inboard-to-outboard location, such that the projection for any area coverage level, j, then becomes:

$$\hat{P}_j(i) = \mu_P(j) + \sum_{k=1}^{3} u_k(j) \cdot \alpha_k(i), \; i = 1, 2, \ldots, N_{pixels}.$$

7. The method of claim 1 wherein the constructing a printer streaks basis function model during printer cycle up further comprises:
    printing test patches of different area coverage levels;
    measuring the reflectivity of the test patches with an in situ sensor;
    determining reflectance profiles of the test patches using the measured reflectivity;
    denoising the reflectance profiles; and
    generating printer streaks basis functions.

8. The method of claim 7, wherein the denoising includes using singular value decomposition denoising producing basis vectors representing the streaks currently being produced as measured by the sensor in terms of the streak profiles.

9. The method of claim 1 wherein the constructing a printer streaks basis function model uses fixed basis functions.

10. The method of claim 9 wherein the fixed basis functions comprise harmonically related sinusoidal functions multiplied by a Gaussian function.

11. The method of claim 1 where the constructing printer streaks basis function model comprises forming a covariance matrix and determining a subset of the covariance matrix eigenvectors.

12. The method of claim 11 where the forming a covariance matrix comprises directly calculating the diagonal and first off diagonal elements; calculating all other elements of the covariance matrix using bootstrapping and symmetry of the covariance matrix, where the bootstrapping function is:

$$C(i, l) = \frac{C(i, k)C(k, l)}{C(k, k)}, \min(i, l) < k < \max(i, l).$$

13. The method of claim 11 where the determining a subset of the covariance matrix eigenvectors comprises performing the power method on the covariance matrix.

14. The method of claim 1 where the constructing a printer streaks basis function model comprises calculating a singular value decomposition on the reflectance data.

15. The method of claim 14 further comprising using the power method using initial vectors comprised of discrete cosine transform basis vectors modulated element-by-element by the standard deviation of the reflectance for each area coverage to calculate the singular value decomposition.

16. A method of printer streak compensation comprising:
 constructing a printer basis function model;
 printing test images during a print job printing print job images, each test image having a different area coverage level such that the area coverage levels of the test images are spaced across the range of tones that the printer can print;
 making streak profile measurements at a limited number of area coverage levels; and
 estimating and projecting streak behavior at all area coverage levels and at all inboard-to-outboard spatial locations being printed using the printer basis function model;
 printing streak corrected printed job images during run time using the projected streak behavior in a pixel-wise error feedback control scheme to drive each profile to a desired shape.

17. The method of claim 16 wherein the printer streaks basis function model is estimated based on data obtained at cycle up.

18. The method of claim 16 wherein the printer streaks basis function model is a set of fixed basis functions.

19. The method of claim 18 where the fixed basis functions comprise harmonically related sinusoidal functions multiplied by a Gaussian function.

20. A digital printer comprising:
 a full width array sensor directly measuring the reflectance of a subset of an entire set of test images in a streak control signal update cycle, the subset of test images representing area coverage levels including a shadow region, a midtone and a highlight region of area coverage level; and
 a signal processing and control unit constructing a printer streaks basis function model during printer cycle up and performing the steak control update cycle including:
   projecting across the area coverage levels of all of the test images by inferring the reflectances of the test images not directly measured during the streak control signal update cycle using the measured reflectances of the subset of test images and the printer streaks basis function model,
   updating the reflectance profiles for all of the test images, and
   calculating updated spatially varying tone reproduction control signals for producing streak-corrected print job images using the updated reflectance profiles.

* * * * *